United States Patent [19]

Keyser et al.

[11] Patent Number: 5,069,917

[45] Date of Patent: Dec. 3, 1991

[54] METHOD OF PREPARING HOT OAT CEREAL IN A MICROWAVE OVEN

[75] Inventors: William L. Keyser, West Dundee; Ronald K. Medrow, Spring Grove; Thomas E. Milling, Lake Zurich, all of Ill.

[73] Assignee: The Quaker Oats Co., Chicago, Ill.

[21] Appl. No.: 667,614

[22] Filed: Mar. 8, 1991

Related U.S. Application Data

[62] Division of Ser. No. 272,286, Nov. 15, 1988.

[51] Int. Cl.$^5$ ............................................. A23L 1/00
[52] U.S. Cl. ................................. 426/243; 426/509; 426/619
[58] Field of Search ............... 426/241, 243, 509, 619, 426/622; 219/10.55 M

[56] References Cited

U.S. PATENT DOCUMENTS 2,632,705  3/1953  Scharf ................................. 426/622
4,978,543  12/1990  Finnerty et al. ..................... 426/243

Primary Examiner—George Yeung
Attorney, Agent, or Firm—Mart C. Matthews; Lars S. Johnson

[57] ABSTRACT

A microwave oat cereal, a method of its manufacture, and a method of its consumer-preparation is disclosed.

A one-ounce single serving of the product of this invention can be fully cooked in a microwave oven in a single serving bowl without foam-over. The cereal comprises a mixture of an oat cereal pieces, such as oat flakes, or oat bran, and a small amount of lecithin, preferably in the form of a powder and preferably in the form of discrete solid encapsulated lecithin. The lecithin is present in an amount effective to prevent foaming out of a single serving bowl when a single serving of the mixture is cooked with water in a microwave oven. Also, the lecithin may be affixed to the surface of the oat cereal such as by spraying, or by allowing encapsulated lecithin to contact the cereal while the cereal is at temperature above the melting point of the encapsulated lecithin.

The mixture of oats and the lecithin powder is particularly suitable for individual serving packaging, and the mixtures in which the lecithin is bonded to the surface of the oat cereal are particularly well suited for bulk packaging, but can be used in individual serving packaging, as well.

The lecithin is present in the cereal an amount of at least 0.01 gram per ounce of oat cereal. Lecithin is a natural ingredient and is GRAS.

7 Claims, No Drawings

METHOD OF PREPARING HOT OAT CEREAL IN A MICROWAVE OVEN

This is a divisional of copending application Ser. No. 07/272,286 filed on Nov. 15, 1988.

TECHNICAL FIELD

This invention relates to a hot oat cereal which is capable of reliable microwave preparation of a individual serving in a conventional single serving bowl. Heretofore, typical microwave instructions called for preparation of a single serving of oats in a much larger container, because of the foam-over propensity of oats under microwave conditions. It would be very much more convenient if all types of hot oat cereal could be prepared, reliably, in a microwave oven in the same bowl from which it is to be eaten.

BACKGROUND

For reasons which are not fully understood, presently available oat cereals tend to foam during cooking. This problem is most extreme in connection with the cooking of the thicker types of oat flakes, such as, for example, Old Fashioned Oat Cereals. This foaming occurs to such an extent that, if conventional one-serving size bowls are used, some of the contents of the container being heated will tend to spill over onto the range top or onto the oven once boiling temperatures are reached, and well within the time required to cook the cereal.

With the recent meteoric increase in the use and availability of microwave ovens, this method of consumer preparation of hot oat cereals has also become increasingly attractive. It is believed that parents are increasingly likely to encourage their pre-teen and adolescent children to prepare a personal serving bowl of hot oat cereal in the microwave. The tendency to foam out of the bowl in ordinary microwave preparation was so great that considerable care and precision had to be exercised in measuring, timing, etc. And, of course, many youthful consumers, and others, are not particularly noted for taking great pains in the precision of their routine activities. The inconvenience inherent in incurring the risk of foam-over greatly reduces the extent to which the consumers can capitalize on this wonderfully convenient potential single serving method for preparing ho cereals.

On the other hand, hot cereals, for example, hot whole grain oat cereals such as oatmeal, which naturally also contains oat bran, have been achieving higher and higher degrees of acceptance by consumers. This may be due, in part, to the widespread publication of the impact of oat bran in providing a healthful lowering of cholesterol components in the human system. In addition, the Oat is a highly nutritious grain, not only in terms of possessing outstanding water soluble fiber levels, but also in terms of the attractiveness of its protein, mineral and lipid content and other nutritive components. Oats is reported to have the highest protein content of all the cereal grains.

In view of the increased appreciation of the beneficial effects of oat products, it is highly desirable to improve the efficiency, convenience and results of the consumer preparation of such oat products, such as oatmeal and oat bran, without adversely affecting the natural wholesomeness of the products.

Also, the widespread utilization of these benefits would be enhanced by substantial improvements in the convenience and satisfaction of consumer preparation, and by improvements in the quality of the consumer-prepared product.

However, the increasingly stringent consumer standards for high quality products, in terms of both organoleptic and convenience attributes, and in terms of healthful nutritional impact, must be achieved in products of very economical manufacturing processes, in order for the cereal product to survive in the current, highly competitive marketplace. Moreover, such products, when packaged in conventional packaging materials, must be shelf stable, to the extent of remaining in a desirably consumable form, and in a form which is readily prepared by the consumer, during the entire time after manufacture and packaging, and up to the consumption by the consumer.

In addition to convenience of consumer preparation, other attributes such as texture, aroma and flavor are also important in the success of competitive hot cereal products. Moreover, there are a variety of types of oat cereals, in which the types are characterized by flake thicknesses, which must be made available in order to meet consumer preferences and demands, such as for example Steam Table (0.025–0.028"), Old Fashioned (0.020–0.024"), Quick (0.015–0.019"), and Instant (0.011–0.014") types. Thickness also affects the convenience of consumer preparation. We have discovered that the thicker the flakes, the more acute the microwave boilover problem. Improvements in oat processing which make the product better for microwave preparation should be amenable to the manufacture of all types of oat flake products.

Hence, it would be desirable to provide improvements in oat processing which result in an oat cereal product which, when prepared by the consumer, is not particularly sensitive to reproduction of exact microwave conditions such as timing and the quantity of water, for successful consumer preparation in the microwave.

It is an object of the present invention to provide a hot oat cereal which is particularly well suited to preparation in a microwave oven.

It is also an object of the present invention to provide a high speed, competitive process for the manufacture of microwave flaked or rolled hot oat cereals.

It is a further object of the present invention to provide an economical commercial process for manufacture of hot oat cereals of all types and kinds, including oatmeals, oat brans, etc. which can be reliably prepared in a microwave oven without boilover during the normal cooking cycle required to cook the product, and develop flavor, etc.

It is also an object of the present invention to provide a method for such manufacture which results in a shelf stable product having improved flavor and texture qualities when consumer-prepared.

SUMMARY OF THE INVENTION

A major purpose of this invention is to control the problem of foaming during microwave preparation of oat cereals. The invention utilizes the incorporation of a very small amount of lecithin, preferably oxidation protected lecithin such as encapsulated lecithin, in each serving of the oat cereals.

DETAILED DESCRIPTION OF THE INVENTION

In one embodiment of the present invention, a lecithin product can simply be applied to the water-oats mixture before it is placed into the microwave oven during consumer preparation.

In other embodiments, the lecithin, or encapsulated lecithin, ingredient can be admixed with the dry oat cereal as a powder, for example. Alternatively, molten or liquid solutions of lecithin, preferably in encapsulation materials, can be sprayed onto the oat cereal pieces, for example onto a thin bed passing in a conveyer, whereby, when cooled, or dried, the lecithin becomes attached to the surface of the cereal pieces.

The utilization of lecithin, or encapsulated lecithin, with oat cereal, e.g. rolled oats, in accordance with this invention, reduces the extent of oat cereal foaming during consumer preparation to such low levels that a single serving (one ounce) of the cereal can be microwave-prepared by the consumer in a relatively small, conventional single serving bowl having a capacity of only 16 ounces, for example.

We have discovered that pure lecithin is subject to oxidative deterioration during long term storage, and hence, for embodiments involving long term storage, it is preferred that the lecithin be protected against oxidative deterioration before its use in accordance with this invention. For example, well-known and widely used antioxidants such as BHA, BHT TBHQ, etc., can be added to the lecithin to provide such protection. However, we prefer to utilize an encapsulation technique, employing hydrogenated natural ingredients, to provide the protection of the lecithin, a natural material, from oxidative deterioration.

The preferred encapsulated lecithin ingredient, in accordance with preferred aspects of this invention, is a material which is encapsulated in a fat which is a solid at normal ambient storage conditions, and liquid at microwave cooking temperatures. Fats which are particularly preferred are the tri-glycerides. It is our belief and understanding that the encapsulating fats must melt below the boiling temperatures during consumer preparation, in order to "release" the lecithin into the aqueous phase. Hydrogenated soybean oil, (M.P. 150–160 Deg. F.) and hydrogenated cottonseed oil (M.P. 140–150 Deg. F) are eminently satisfactory for use in this invention, for example. However, any edible encapsulant, such as an encapsulating fat, for example, which provides oxidative stabilization can be used in accordance with this invention.

The encapsulated lecithin ingriegents can be in powder form, or as one of many alternatives indicated above, can be sprayed as hot, molten solutions of encapsulant and lecithin directly onto the oat cereal pieces.

We have also determined that the preferred encapsulants, namely the tri-glycerides, in and of themselves, are not effective in reducing the foam-over propensity of oat cereals when cooked in the microwave. However, their presence has been found not to detract in the least from the effectivness of the lecithin in combating boilover, and in fact the presence of the encapsulating fats seem to enhance the effectiveness, allowing for the use of lower concentrations of lecithin, based on the weight of the cereal.

As stated above, we have discovered that when lecithin is used by itself in admixture with oats for the purpose of providing a foam suppressant, the lecithin can undergo oxidative deterioration during long-term storage. This renders the admixed product unsuitable for long term storage as a packaged product for consumer use because of the long term development of off flavors reminiscent of rancidity. Practice of the preferred method of the present invention, using oxidation-protected lecithin such as encapsulated lecithin, not only results in a product in which the foam-over propensity during microwave cooking is eliminated, it also provides a storage stable product which is highly rated by consumer panels after consumer-preparation in the microwave, even after it has been subjected to long term-storage.

The art of commercially preparing oats for the various manufacturing processes is long-established, and well known. The preliminary processing which is well-known, included a gentle heat treatment for the purpose of deactiving the enzyme systems but without exacerbating the development of free fatty acids. The resulting materials are then ground, or flaked in accordance with well-known processes. These oat products, even the so-called instant oats, have been found to be uncooked after such processing. The oat cereal component which is the starting material for the process and product of the present invention is any these conventionally prepared, enzyme-stabilized oat products. Hence, the method of the present invention is applicable to the conventional manufacture and use of oat groats, cut and or flaked groats, such as oatmeals, as well as to the manufacture and use of components or fractions of oat grains, such as, for example, granular or flaked oat bran, or oat bran concentrate.

The term lecithin, as used herein, refers to any or all of the phosphatides, pure or in blends comprising phosphatidylcholine, phosphatidylethanolamine, phosphatidylinositol, and/or phosphatidylserine, and/or other phosphatides regarded as lecithins. As natural products, these materials are almost always found in naturally occuring blends or mixtures. Hence, the term "pure lecithin", is probably a misnomer. An exemplary approximate composition of pure natural soybean lecithin has been reported to include 35% soybean oil, 19% phosphatidylcholine, 19% phosphadylethanolamine, 21% phosphatidylinositol and other phosphatides, and 5% carbohydrates and minor constituents. As used herein, the term "lecithin" is intended to encompass any lecithin ingredient in any of the edible, commercially available forms.

Edible, commercially available lecithins are well-known, widely available, and are described and defined in detail in the public literature. For example, they are described in: Kirk Othmer, Encyclopedia of Chemical Technology, Volume 14, pages 250–269; in the Encyclopedia of Food Science, Peterson and Johnson, editors, Avi Publishing Co. 1978, Pages 461, 467; and in the book, LECITHINS, edited by Bernard F. Szuhaj, and Gary R. List, which was published by the American Oil Chemists' Society as a monograph. (Also see especially Chapter 8, COMMERCIAL LECITHIN PRODUCTS; FOOD USE OF SOYBEAN LECITHIN, by W. E. Prosise.) The descriptions of lecithin in these documents will not be repeated here, in view of the fact that such information is so well known; but these widely available documents in their entirety are incorporated herein, by reference thereto.

Commercially available lecithin is reported in the literature to be soluble in mineral oils and fatty acids, but is reported to be practically insoluble in cold vegetable and animal oils. It is also reported to be insoluble but infinitely dispersible in water.

A preferred lecithin material used as an ingredient in accordance with this invention is a soybean-derived lecithin, such as, for example, a product known as Centrolex F (TM) which is produced by Central Soya Co. It contains a minimum of 95% phosphatides basis acetone insoluble analysis. This material is reported to include a small percentage of added-back mixed tocopherols, for the purpose of enhancing oxidative stability. The tocopherols are reported to be present in the naturally occurring lecithin, are initially separated during processing of the lecithin, and are added back for enhanced oxidative stability.

Lecithin is also available for spray application in commercial products such as those sold under the Trade Mark "Pam."

Preferred aspects of this invention are further illustrated with the aid of the following examples. In addition, for the purpose of comparison only, examples not in accordance with this invention are also provided.

Accordingly, Example 1 shows the microwave preparation of a single serving of one-step Old Fashioned oatmeal containing non-encapsulated lecithin, and using a 2 cup cereal bowl (16 ounce) with a cooking time of 5 to 6 minutes in a 700 watt microwave oven. The full cooking time of 5-6 minutes is preferable in order to develop the full typical oatmeal flavor. Example 1 is provided to illustrate the invention, and the positive anti-foamover effect of the lecithin, which we discovered. However, we show in Example 5 that the oat product of Example 1 containing non-encapsulated lecithin is not long-term storage stable.

Example 3 illustrates a preferred method for preparing an encapsulated lecithin for use in accordance with this invention. Example 4 illustrates the use of that encapsulated lecithin in dry oat cereals, in accordance with this invention, to produce no-foam-over oat cereals. Example 5 provides the storage test summary and results using the products of Examples 1 and 4.

EXAMPLE 1

| | |
|---|---|
| 28.0 grams | Old Fashioned Quaker Oats |
| 0.6 grams | Centrolex F (Commercially available lecithin) |
| 177 grams | Salt water (8 grams salt/3000 grams water) |

The dry ingredients are initially admixed. This is done to prevent the formation of "fish-eyes" when the water is added. The term "fish eyes" is a laboratory technical term which refers to tiny globules of incompletely dispersed, gelatinous masses of lecithin in an aqueous solution or dispersion. Simply stirring the dry ingredients together, for example, will assure even, complete dispersion of the lecithin, and will assure that the so called fish-eyes of lecithin will not form when the water is added later.

The dry ingredients and water are added to a single serving bowl, e.g. to a 16 ounce bowl, stirred, and cooked in the microwave oven for 5 minutes on high setting. (This corresponds to the preparation of a single serving of one ounce using the conventional ¾ cup of water.)

This microwave cooking process resulted in no foam-over in the microwave oven. Similar cooking tests, using the same oatmeal, quantities and conditions, but not using the lecithin, resulted in voluminous foam-over, making a mess of the microwave oven.

Interestingly enough, when the same amounts of lecithin and water first set forth above in Example 1 are admixed without the oats, and this dispersion is subjected to boiling in a microwave oven, the mass foams copiously and boils over out of the bowl making a mess of the oven.

EXAMPLE 2

In an alternative embodiment, lecithin is applied to the surface of a mixture of water and lecithin-free oats by spraying the mixture with the lecithin product commercially available under the Trade Mark "PAM". Oats and water, in the ratio set forth above in Example 1, but without the lecithin, are added to a single serving bowl, e.g. to a 16 ounce bowl, stirred, sprayed with "Pam" (TM) and cooked in the microwave oven for 5 min on high setting. (This corresponds to the preparation of a single serving of one ounce using the conventional ¾ cup of water.)

The latter microwave cooking process resulted in no foam-over in the microwave oven.

EXAMPLE 3

This Example illustrates the preparation of encapsulated lecithin for use as an ingredient in accordance with preferred aspects of the present invention. Exemplary encapsulated lecithin ingredients prepared in accordance with this example are used in Example 4 in the preparation of a microwavable oatmeal product in accordance with preferred aspects of this invention.

Respective samples of hydrogenated soybean oil (MP 150-160 Deg. F) and hydrogenated cottonseed oil (MP 140-150 Deg. F.) were melted. Lecithin was added to the respective melts, at a ratio of 80 parts fat to 20 parts lecithin, and stirred.

In each instance, this gave good dispersion of the lecithin in the hot liquid. Each material was split into two parts, and the first part of each material was allowed to cool with continual mixing.

When solidified, each of the resulting cooled mixtures were ground to a fine powder, and screened to −30+60 mesh size. These powder mixtures are exemplary of encapsulated lecithin for use in accordance with this invention, for admixing with oat cereal pieces.

The second part of each fat-lecithin material prepared above was sprayed, while molten, directly onto oat cereal pieces passing in a very thin bed on a conveyor. The spray-on use of the second parts of each material illustrates another alternative practice of the present invention. In the latter case, the encapsulated lecithin became attached to the surface of the oat pieces while in the form of fine droplets, and became firmly attached or bonded to the surface when the temperature of the composite reached a temperature below the melting point of the encapsulant/lecithin mixture, e.g. room temperature.

EXAMPLE 4

In accordance with a preferred practice of this invention, each of the powdered encapsulated lecithin ingredients which are produced in Example 3 are tested in respective tests by admixing the powdered materials with various oat products in respective amounts, as set forth below in this Example.

In preparation for microwave cooking, the following ingredients are admixed in a 16 ounce bowl:

| | |
|---|---|
| 28.0 grams | Old Fashioned Quaker Oats/powdered encapsulated lecithin from Example 4, above. |
| 177 grams | Salt water (8 grams salt/3000 grams water) |

The resulting respective mixtures are cooked in a microwave oven on the high setting for 5 minutes. No foam-over is observed during the microwave cooking of any of the samples.

Substantially identical consumer preparation results are observed whether the encapsulated lecithins of Example 3 are admixed with the oat cereal pieces in powder form, or whether attached to the surfaces of the cereal particles as fine spray droplets.

The encapsulated lecithin mixtures of Example 3 are found to be effective against foamover, whether added to the oat cereal pieces as a solid or as droplets. When used with the oat products in an amount in the range of about 0.1 gram to 1 gram of encapsulated lecithin per 28 grams (one ounce) of oat cereal, preferred results are obtained. Using encapsulated lecithin ingredient containing 20% lecithin, this corresponds to the range of about 0.35% to 3 5% by weight of encapsulated lecithin ingredient based on the weight of the oat product.

Hence, since the preferred encapsulated lecithin ingredient comprises 20% lecithin, amounts in the range of 0.07% to 0.7% by weight lecithin, based on the weight of the oat product are necessary for preferred embodiments of this invention. However, higher levels can be used, but are not necessary, and are deemed to be merely wasteful from an economic point of view.

The preceding consumer preparation procedure of this Example is repeated except that the encapsulated lecithin is omitted from the oat cereal. During the microwave cooking step, the Old Fashioned Oats/water mixture foamed out of the bowl and made a mess of the oven.

The first-described procedures of this Example are repeated again, except that corresponding quantities of the powdered encapsulating fats, without lecithin, are added to the same batch of dry oat cereals before the microwave preparation step, and a microwave cooking test was performed using the same amounts and same conditions used in the practice of this invention in this Example, but without any lecithin. In each instance, the cereal-fat-water mixture foamed out of the bowl during the microwave cooking step. Hence, it is clear that the fat component in the encapsulated lecithin is not the cause of the foam-suppressing effect.

EXAMPLE 5

The respective oats/lecithin products and the oats-/encapsulated-lecithin products produced in accordance with the procedures of Examples 1 and 4 are subjected to accelerated storage testing.

It is found that the packaged product of Example 1, utilizing non-encapsulated lecithin powder, though eminently satisfactory for use within a period of weeks, developed off flavors during accelerated long-term storage to such an extent that the product would not meet conventional standards for "freshness". The products of Example 4, utilizing the encapsulated lecithin, and being in accordance with this invention, proved to be storage stable, and developed no unsatisfactory flavors even after prolonged storage under accelerated storage conditions. The latter products are found to be completely acceptable by taste panels.

Hence, for long term storage in a packaged product, it is preferred to utilize lecithin which is encapsulated or otherwise protected from oxidative deterioration.

EXAMPLE 6

The procedures of Example 4 are repeated, except that the respective solid encapsulated lecithin ingredients are dusted onto the oat flakes as they come out of the flaking rolls, and while the oats are at a temperature above the melting point of the respective powdered encapsulated lecithin mixtures. The respective powdered encapsulated lecithin mixtures are found to bond to the flakes, and to solidify, so bonded, when the resulting cereal is cooled to a temperature below its melting point, e.g. to ambient room temperature.

When subjected to microwave cooking tests, the products of this Example do not foam-over, and when subjected to accelerated storage tests, the products of this Example are found to be storage stable.

The product of this Example 6 is eminently satisfactory for use in bulk packaging, such as, for example, in 1 pound, 5 pound, or 50 pound packages, as are all the embodiments of this invention in which the lecithin is attached to, or bonded to, the oat flakes. Whereas the product of Example 4 which is a simple mixture of powdered lecithin ingredient with the oat cereal particles is preferably packaged in individual serving containers, e.g. in one ounce quantities.

DISCUSSION

Encapsulated lecithins produced as in Example 3, except that the lecithin contents of the lecithin-fat mixture are in the range between 5% and 85%, give similar results to those described in connection with encapsulated lecithins in Examples 3 and 4, above. However, we prefer to use encapsulated lecithins having compositions in the range of 15-50% lecithin, based on the weight of the encapsulated lecithin ingredient, more preferably in the range of 15-35%.

In the preferred embodiments illustrated in the above Examples, the type of oat cereal known as "Old Fashioned Oats" is employed. This is done to provide a particularly stringent test for antifoamover properties. The product and method of this invention can be applied to other types of oat cereals, as well. For example, it is used with good advantage with Steam Table Oats, Quick Oats and Instant Oats. However, the consumer preparation foam-over problem is most severe in the case of conventional Old Fashioned Oats, and thicker rolled oats such as for example, Steam Table Oats. Hence, the greatest advantage is forthcoming when those relatively thick types of oats are used in accordance with this invention.

We claim:

1. In a method of preparing a hot oat cereal in a microwave oven which comprises the steps of mixing dry oat cereal with water to form an aqueous mixture, and cooking the resulting mixture in a microwave oven while said mixture is in a container, the improvement which comprises cooking said resulting mixture in the presence of lecithin in an amount effective to prevent said mixture from foaming out of said container during said microwave cooking step.

2. The method of claim 1 in which lecithin is mixed with the dry oat cereal prior to the microwave cooking step.

3. The method of claim 1 in which lecithin is applied to the surface of the dry oat cereal prior to the microwave cooking step.

4. A method of preparing hot oat cereal in a microwave oven which comprises the steps of:
(a) combining an oat cereal with lecithin to form a dry oat-lecithin composition;
(b) mixing in a suitable container a sufficient quantity of said composition with a sufficient quantity of water to form a single serving of said oat cereal; and
(c) cooking the container of said composition in a microwave oven, said lecithin being present in an amount effective to prevent said composition from foaming out of said container during said cooking.

5. The method of claim 4 in which said lecithin is encapsulated and formed into a powder before it is combined with the oat cereal.

6. The method of claim 5 in which said oat cereal and powdered encapsulated lecithin are combined in a single serving quantity and packaged in an individual package prior to mixing said composition with water.

7. The method of claim 4 in which said lecithin is combined with said oat cereal as a coating on the surface of the oat cereal particles.

* * * * *